Jan. 29, 1952          J. GOERGEN          2,583,831

COLLET CHUCK FOR FISHING POLE HANDLES

Filed June 10, 1947

*INVENTOR.*
JOHN GOERGEN
BY
*Christian R. Nielsen*
*ATTORNEY.*

Patented Jan. 29, 1952

2,583,831

UNITED STATES PATENT OFFICE 2,583,831

COLLET CHUCK FOR FISHING POLE HANDLES

John Goergen, Milwaukee, Wis.

Application June 10, 1947, Serial No. 753,773

1 Claim. (Cl. 279—54)

My invention relates to improvements in fishing rod handles and more particularly to a handle that is adapted to support both a fishing rod and a reel.

The object of my invention is to provide a support that will accommodate a fish pole of varied diameter in a manner whereby the pole is gripped at two points, thereby preventing any whipping action when the pole is being used.

Another object of my invention is to incorporate into such a device a means to prevent the rod from turning while it is being gripped, thereby retaining the line guides in proper position at all times.

Still another object of my invention is to provide a handle that enables the reel to be rigidly clamped in the proper position in a manner to permit its removal and replacement with but a single thumb manipulation.

A still further object of my invention is to provide a fish pole handle that is adaptable to fit varied poles and reels, one that may be economically manufactured and performs efficiently the purpose for which it is intended.

Other and further objects of my invention will become more apparent as the description proceeds and when taken in conjunction with the drawings in which Figure 1 is a side view of the assembled handle showing the reel and pole section in phantom.

Figure 2:
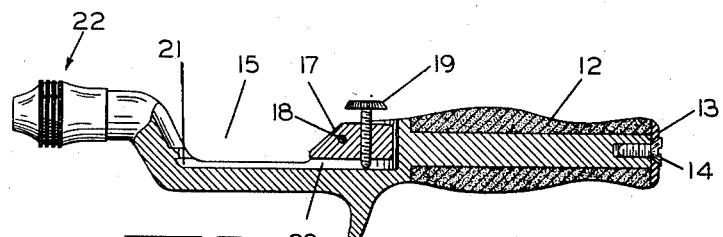
Figure 2 is a fragmentary cross-sectional view of the device showing the reel clamping arrangement.
Figure 3:
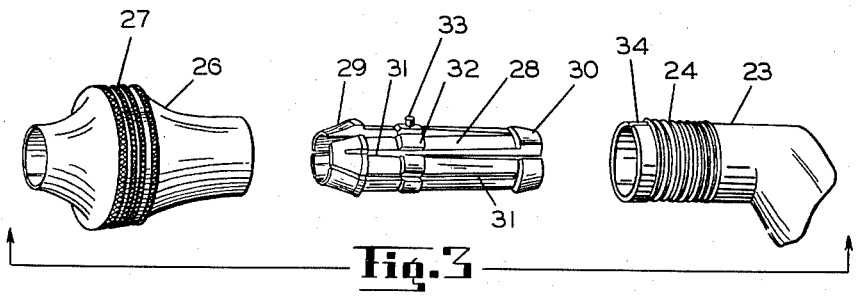
Figure 3 is an aggregation of the component parts constituting the pole clamping arrangement.
Figure 4:
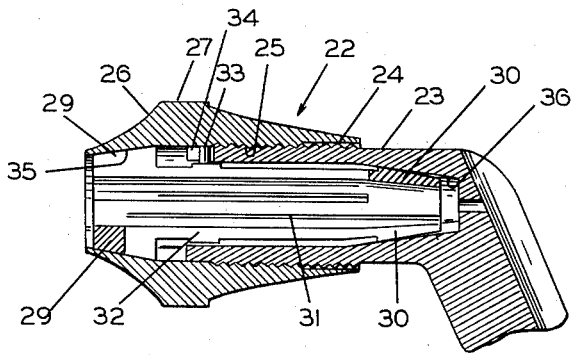
Figure 4 is a cross-sectional view of the end of the handle showing the pole clamping feature.

Similar characters of reference indicate corresponding parts throughout the several views and referring now to the same, the character 10 shows a fish pole handle provided with a downwardly extending member 11 which is employed for the engagement of one of the user's fingers while the handle is firmly grasped by the grip portion shown as 12. This grip portion 12 is provided with an end plate 13 fastened by means of a screw 14 to the end of the handle 10. The handle portion 10 is shown provided with a recess section 15 which is arranged for the support of a reel 16 shown in phantom. There is a hinged block 17 shown supported by a pin 18. This block 17 is disposed on the rearward portion of the recess portion 15 and is provided with a thumb screw 19 which threadedly engages the block 17. It will be noted that the block 17 is raised from the bottom of the recess portion 15 as shown in Figure 2 at 20 and the forward end of the recess portion 15 is provided with an engaging slot 21 which is arranged to take one end of the reel mounting while the other end of the reel mounting is placed into the opening 20 formed by the hinged block 17 and the bottom of the recess portion 15. As the thumb screw 19 is turned it will cause the rearward end of the hinged block 17 to raise or lower, thereby clamping or releasing the end of the reel at the forward end of the block. Obviously, when the forward end of the block 17 is brought downward, the rearward end is brought upward by the action of the thumb screw 19 which will cause the clamping action.

At the forward end of the handle portion 10 is shown a chuck assembly indicated by the character 22. This chuck assembly 22 consists of a receiving sleeve 23 forming a part of the handle 10. This sleeve 23 is provided with an outside thread 24 for engagement with the inner thread 25 of the clamping nut shown as 26 which is also provided with a knurled outer section shown as 27 to permit its being manipulated or turned when in threaded engagement with the receiving sleeve 23 of the handle portion 10.

There is a collet member shown as 28 having an outwardly extending portion 29 at its forward end and an outwardly extending portion 30 at its rearward end. The collet is cylindrical in shape and is provided with a plurality of slots shown as 31. These slots are in staggered relation to one another and have their open end at either the front or rear end of the collet body proper. The slots being alternated so that one slot 31 has its open end rearward, the next one has the open end toward the front of the collet 28.

This collet 28 is also provided with an intermediate portion 32 which is raised from the outer peripheral surface of the collet body 28 and this raised portion 32 is provided with an upwardly extending pin 33 which engages a slot 34 on the receiving sleeve 23 of the handle portion 10 so that when the collet 28 is inserted into the receiving sleeve 23 the pin 33 will engage the slot 34 and keep the collet 28 from turning.

Figure 1:
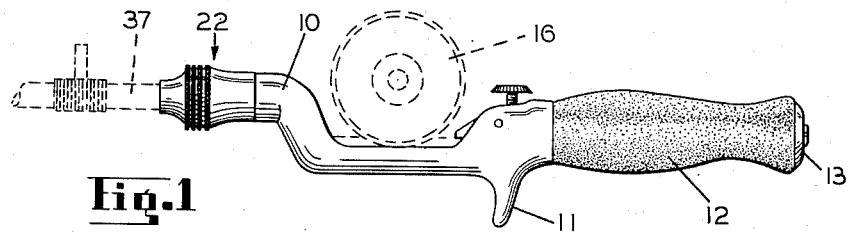

It will be noted that the clamping nut 26 has an angularly disposed portion 35 at its forward end, while the receiving sleeve 23 is also provided with an angular surface 36 and as the clamping nut 26 is threadedly engaged onto the thread 24 of the sleeve 23 it will cause the collet 28 disposed within the assembly to have its forward ends 29 brought to a smaller diameter due to the spring action of the collet 28 and the rearward end 30 of the collet will be brought into contact with the tapered face 36 of the receiving sleeve 23 causing it to diminish in size and when a pole shown in phantom as 37 in Figure 1 is inserted into the collet 28 turning the clamping nut 26 will cause the pole 37 to be clamped at the forward and rearward end in the collet 28, thereby eliminating any whipping action in the support of the pole when in use.

In the chosen embodiments of my invention there are many features not heretofore disclosed in the prior art and even though I have shown but a single arrangement of the component parts constituting the device, I am fully cognizant of the fact that it is possible to make changes in the form and configuration of these component parts without effecting their efficiency or operativeness and I reserve the right to make such changes as I may deem convenient or necessary without departing from the spirit of my invention or the scope of the appended claim.

Having thus described my invention, what I claim and desire to secure by Letters Patent in the United States is:

A device of the character described to be used in conjunction with a fishing pole and reel, said device comprising a handle having a grip mounted on its rearward end, a chuck assembly arranged on the forward end of said handle and including a cylindrical sleeve provided with an exteriorly threaded portion, said sleeve forming a part of the forward end of said handle, a nut member arranged in threaded engagement with the threaded portion of said sleeve, said nut member being provided with an exteriorly knurled surface, a cylindrical collet member having an outwardly extending portion on each end thereof for clamping said pole into said collet member, there being a first set of spaced parallel slots extending from one end of said collet member, there being a second set of spaced parallel slots interposed between the slots of the first set and extending from the opposite end of said collet member, said collet member being of cylindrical shape and positioned in said sleeve, said collet member being provided with an intermediate portion that is raised, a pin extending from said raised portion, said sleeve being provided with a slot for receiving said pin to prevent accidental rotation of said collet member, said clamping nut being provided with an angular front portion, said sleeve being provided with an angular surface whereby rotation of said nut causes said collet member to have its forward and rear ends brought to a smaller diameter.

JOHN GOERGEN.

REFERENCES CITED

The following references are of record in the file of this patent:

UNITED STATES PATENTS

| Number | Name | Date |
|---|---|---|
| 160,954 | Reilley | Mar. 16, 1875 |
| 789,021 | Hartman | May 2, 1905 |
| 1,081,183 | Wood | Dec. 9, 1913 |
| 1,965,796 | Dunkelberger | July 10, 1934 |
| 2,422,084 | Dorner | June 10, 1947 |
| 2,443,567 | Moulton | June 15, 1948 |
| 2,469,014 | Stalhandske | May 3, 1949 |
| 2,476,762 | Petre et al. | July 19, 1949 |